(12) United States Patent
Papastergiou

(10) Patent No.: US 8,629,648 B2
(45) Date of Patent: Jan. 14, 2014

(54) PHOTOVOLTAIC SYSTEM

(75) Inventor: Konstantinos Papastergiou, Västerås (SE)

(73) Assignee: ABB Research Ltd, Zurich (CH)

( * ) Notice: Subject to any disclaimer, the term of this patent is extended or adjusted under 35 U.S.C. 154(b) by 396 days.

(21) Appl. No.: 13/163,405

(22) Filed: Jun. 17, 2011

(65) Prior Publication Data

US 2011/0278929 A1    Nov. 17, 2011

Related U.S. Application Data

(63) Continuation of application No. PCT/EP2009/067568, filed on Dec. 18, 2009.

(30) Foreign Application Priority Data

Dec. 19, 2008    (EP) .................................... 08172417

(51) Int. Cl.
   *H02J 7/00*    (2006.01)
(52) U.S. Cl.
   USPC ............ 320/101; 320/138; 323/906; 136/261
(58) Field of Classification Search
   USPC ......................................................... 320/101
   See application file for complete search history.

(56) References Cited

U.S. PATENT DOCUMENTS

| | | | |
|---|---|---|---|
| 4,134,057 A | | 1/1979 | Portmann |
| 4,165,477 A * | | 8/1979 | Comte ........................... 320/101 |
| 5,327,071 A * | | 7/1994 | Frederick et al. ............. 323/299 |
| 5,929,538 A * | | 7/1999 | O'Sullivan et al. ............. 307/66 |
| 6,034,506 A * | | 3/2000 | Hall .............................. 320/117 |
| 6,262,558 B1 * | | 7/2001 | Weinberg ....................... 320/101 |
| 2002/0146617 A1 * | | 10/2002 | Johnson et al. .................. 429/50 |

(Continued)

FOREIGN PATENT DOCUMENTS

| | | |
|---|---|---|
| DE | 26 46 715 A1 | 11/1977 |
| DE | 42 04 237 A1 | 8/1993 |

(Continued)

OTHER PUBLICATIONS

International Search Report (PCT/ISA/210) issued on Aug. 11, 2010, by European Patent Office as the International Searching Authority for International Application No. PCT/EP2009/067568.

(Continued)

*Primary Examiner* — Yalkew Fantu
(74) *Attorney, Agent, or Firm* — Buchanan Ingersoll & Rooney PC

(57) ABSTRACT

Exemplary embodiments of the disclosure relates to a photovoltaic system for generating an output voltage which is uninfluenced by varying irradiation. The photovoltaic system includes at least one photovoltaic unit having two photovoltaic sources, wherein each photovoltaic source includes an input terminal and an output terminal. The photovoltaic unit includes two voltage adding arrangements, each voltage adding arrangement having a first route including a voltage source and a second route including a voltage source bypass. The first voltage adding arrangement is connected in series with the first photovoltaic source and the second voltage adding arrangement is connected in series with the second photovoltaic source. A switch is arranged between an input terminal of the first photovoltaic source and an output terminal of the second photovoltaic source. The input terminals of the photovoltaic unit, which include an external interface of the photovoltaic system, are interconnected and the output terminals of the photovoltaic unit constituting the external interface of the photovoltaic system are interconnected.

15 Claims, 9 Drawing Sheets

(56) References Cited

U.S. PATENT DOCUMENTS

| | | |
|---|---|---|
| 2003/0230334 A1 | 12/2003 | Chang et al. |
| 2006/0231132 A1* | 10/2006 | Neussner ...................... 136/244 |
| 2008/0099062 A1* | 5/2008 | Armstrong et al. ........... 136/248 |
| 2008/0211451 A1 | 9/2008 | Zhang et al. |
| 2008/0309283 A1 | 12/2008 | Neeb et al. |

FOREIGN PATENT DOCUMENTS

| | | |
|---|---|---|
| EP | 1 901 414 A | 3/2008 |
| FR | 2 335 081 A | 7/1977 |
| WO | 2006/041296 A2 | 4/2006 |

OTHER PUBLICATIONS

Search Report issued on May 26, 2009, by European Patent Office for Application No. 08172417.

International Search Report (PCT/ISA/210) issued on Jul. 28, 2010, by European Patent Office as the International Searching Authority for International Application No. PCT/EP2009/067565.

European Search Report issued Jul. 21, 2009 for European Application No. 08172418.

* cited by examiner

PHOTOVOLTAIC SYSTEM

RELATED APPLICATION

This application claims priority as a continuation application under 35 U.S.C. §120 to PCT/2009/067568, which was filed as an International Application on Dec. 18, 2009 designating the U.S., and which claims priority to European Application No. 08172417.1, filed Dec. 19, 2008. The entire contents of these applications are hereby incorporated by reference in their entireties.

FIELD

The present disclosure relates large solar parks such as photovoltaic systems arranged to generate an output voltage that is uninfluenced by variable irradiation/weather, i.e. clouds shading the photovoltaic source.

BACKGROUND INFORMATION

The use of photovoltaic systems to generate power is increasingly establishing itself around the globe. Photovoltaic systems, also known as solar panel systems, can be easy to install, inexpensive to operate and can be used practically anywhere where sunlight is available. The various possibilities range from small fixed systems for home use right through to large solar parks with mobile solar modules that follow the position of the sun.

A photovoltaic source, such as a photovoltaic module including several photovoltaic cells, or a plurality of photovoltaic modules, should have optimal operation unaffected by irradiation from the sun, and the output voltage should be dependent directly on the degree of the instantaneous irradiation. Thus, when a cloud is shading the photovoltaic source the output voltage of the photovoltaic system can decrease. The direct correlation between the instantaneous irradiation and the output voltage can be a major issue in locations having a varying degree of irradiation.

The power mains, to which a photovoltaic source is arranged to feed electricity, specifies alternating current at a predetermined voltage level. In order to meet these specifications a DC/AC converter can be arranged between the photovoltaic source and the power mains, which converter can be arranged to operate at as wide an input voltage range as possible in order to manage a varying output voltage from the photovoltaic source. A converter managing a wide input voltage range can be proportionately expensive as it usually is comprised of more than one stage. A conventional way of managing a greatly varying input voltage is to use a boost DC/DC converter to provide a reasonable input voltage to said DC/AC converter. The use of a boost DC/DC converter at this stage can reduce the efficiency of the photovoltaic system.

FR 2335081 describes a device for enabling an accumulator to be recharged from a source of electrical energy, such as photo-cells. The device includes a converter circuit and a diode. The converter circuit can adapt the current and voltage supplied by said source to the charging conditions of the accumulator. The converter circuit is arranged to be saturated from a certain value of the current delivered by the source, the stronger currents passing directly through the diode.

SUMMARY

An exemplary embodiment of the present disclosure is directed to a photovoltaic system for generating an output voltage which is uninfluenced by varying irradiation. The photovoltaic system comprises at least one photovoltaic unit comprising two photovoltaic sources, each photovoltaic source including a first connector and a second connector. The photovoltaic unit includes two voltage adding arrangements, where each voltage adding arrangement includes a first connector and a second connector. The photovoltaic system also comprises a first route comprising a voltage source and a second route as a voltage source bypass that extend between said first connector and said second connector of each voltage adding arrangement, wherein said first and second routes all separately activatable. The first connector of the first voltage adding arrangement is connected to a first input terminal of the photovoltaic unit, and the second connector of the first voltage adding arrangement is connected to the first connector of the first photovoltaic source, and the second connector of the first photovoltaic source is connected to a first output terminal of the photovoltaic unit. The first connector of the second photovoltaic source is connected to a second input terminal of the photovoltaic unit, and the second connector of the second photovoltaic source is connected to the first connector of the second voltage adding arrangement, and the second connector of the second voltage adding arrangement is connected to a second output terminal of the photovoltaic unit. A switch is arranged between the first connector of the first photovoltaic source and the second connector of the second photovoltaic source. In addition the input terminals of the photovoltaic unit, which are included in an external interface of the photovoltaic system are interconnected, and the output terminals of the photovoltaic unit which are included in the external interface of the photovoltaic system are interconnected.

BRIEF DESCRIPTION OF THE DRAWINGS

A more complete understanding and other features and advantages of the present disclosure will be apparent from the following detailed description of exemplary embodiments in conjunction with the appended drawings, wherein.

DETAILED DESCRIPTION

Figure 1:
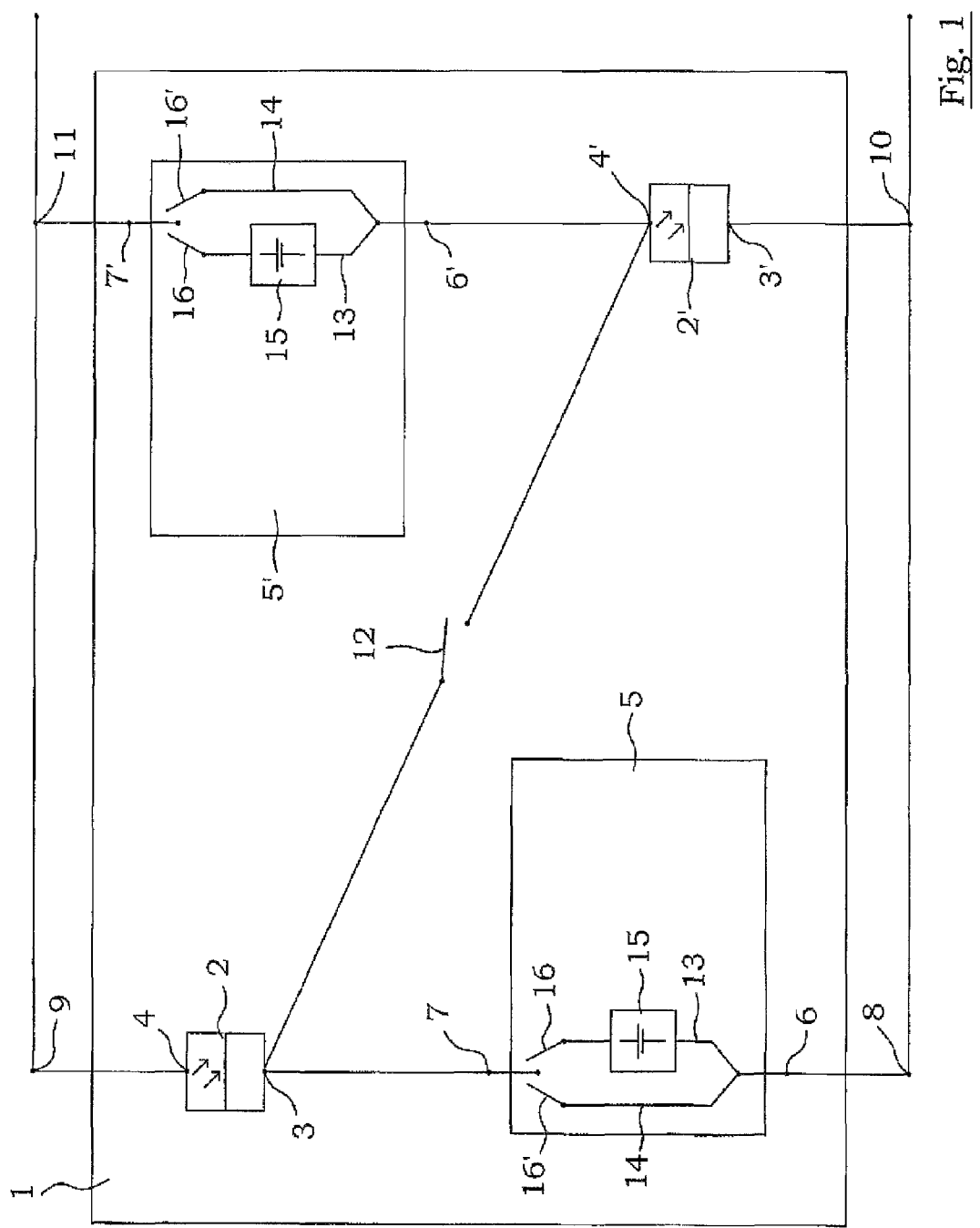
FIG. 1 is a schematic illustration of a first embodiment of a photovoltaic system in accordance with an exemplary embodiment.

The exemplary embodiments of the present disclosure are directed to obviating the aforementioned disadvantages of previously known photovoltaic systems, and at providing an improved photovoltaic system. An object of the exemplary embodiments of the present disclosure is to provide an improved photovoltaic system of the initially defined type which is arranged to generate an output voltage which is essentially uninfluenced by varying irradiation, e.g., a cloud shading the photovoltaic source, or if a specific photovoltaic source is malfunctioning.

The exemplary embodiments of the present disclosure are also directed to providing a photovoltaic system, which adds voltage to the output voltage of the photovoltaic source when the latter is below a predetermined threshold value. The exemplary embodiments of the present disclosure also provide a photovoltaic system, which can store any surplus of the output voltage in order to be self supporting with regards to the occasional need of added voltage The exemplary embodiments of the present disclosure also provide a photovoltaic system capable of delivering an output power day and night, and provide photovoltaic system, which has a reconfigurable architecture such that the output voltage of the photovoltaic system is adjustable based on different modes of operation. The exemplary embodiments of the present disclosure provide a photovoltaic system, which is arranged to generate an output power which is essentially uninfluenced by varying irradiation.

According to an exemplary embodiment present disclosure, a photovoltaic system includes a photovoltaic unit having two voltage adding arrangements. Each arrangement can include, a first connector (first input terminal) and a second connector (output terminal), and a first route having a voltage source and a second route which serves as a voltage source bypass extend between the first connector and said second connector of each voltage adding arrangement. The first and second routes are separately activateable. The first connector of the first voltage adding arrangement can be connected to a first input terminal of the photovoltaic unit, and the second connector of the first voltage adding arrangement can be connected to the first connector (input terminal) of the first photovoltaic source, and the second connector (output terminal) of the first photovoltaic source is connected to a first output terminal of the photovoltaic unit, the first connector (input terminal) of the second photovoltaic source can be connected to a second input terminal of the photovoltaic unit The second connector (output terminal) of the second photovoltaic source can be connected to the first connector of the second voltage adding arrangement, and the second connector of the second voltage adding arrangement can be connected to a second output terminal of the photovoltaic unit. A switch is arranged between the first connector of the first photovoltaic source and the second connector of the second photovoltaic source. In addition the input terminals of the photovoltaic unit constituting the external interface of the photovoltaic system are interconnected and the output terminals of the photovoltaic unit constituting the external interface of the photovoltaic system are interconnected.

Thus, an exemplary embodiment of the present disclosure includes a photovoltaic system that admits different modes of operation, such that an exemplary mode of operation can be used to get a less variable output voltage from the photovoltaic system, even at a location having a variable degree of instantaneous irradiation as well as during the night, or can be used in order to get output power which corresponds to the instantaneous need.

The photovoltaic system can include at least two photovoltaic units connected in series. The first output terminal of the first photovoltaic unit can be connected to the second input terminal of the second photovoltaic unit and the second output terminal of the first photovoltaic unit can be connected to the first input terminal of the second photovoltaic unit. As a result, further combinations of added output voltages can be used to get as invariable an output voltage of the photovoltaic system as possible.

Each voltage source can be a fixed voltage source or a regulated voltage source, and in an exemplary embodiment of the present disclosure, the voltage source can include at least two batteries, which are individually connectable in series with the first route and with each other. Thus, the added voltage from each voltage source can be added in a stepwise manner in order to get as invariable an output voltage of the photovoltaic system as possible.

According to an exemplary embodiment of the present disclosure, at least one voltage adding arrangement includes a charger device connected to the voltage source of the first route. The charger device includes a first input terminal and a second input terminal, at least one of which is connected to a charger switch. In an exemplary configuration, the at least one voltage adding arrangement can be the first voltage adding arrangement and the charger device can be a DC/DC converter. The first input terminal of which can be connected, directly or indirectly, to the first connector of the second photovoltaic source and the second input terminal of which can be connected, directly or indirectly, to the second connector of the second photovoltaic source. Thereby, the charger uses the output voltage from the photovoltaic source to charge the voltage source, and thereby the photovoltaic system is self supporting with regards to the occasional need of added voltage from the voltage adding arrangements.

According to another exemplary embodiment of the present disclosure, the regulated voltage source of the first voltage adding arrangement includes a bidirectional DC/DC converter and a voltage source, which can be connected to a first input terminal and a second input terminal of the bidirectional DC/DC converter. A first output terminal of the bidirectional DC/DC converter can be connected to the first connector of the first voltage adding arrangement and a second output terminal of the bidirectional DC/DC converter can be connected to the first route at the opposite side of the route switch than the second connector of the first voltage adding arrangement and is connected by means of a charger switch, direct or indirect, to the second connector of the second photovoltaic source. Thereby the quantity of added voltage from each voltage adding arrangement to the photovoltaic system is regulatable, which result in the quantity of the added voltage in theory ranges from 0% to 100% of the maximum voltage level of the voltage source, or even higher than 100% if the regulator is of a suitable boost converter type.

A photovoltaic system, also known as a solar panel system, includes at least one photovoltaic unit 1 having two photovoltaic sources 2, 2'. The smallest structural part of a photovoltaic source 2 is a photovoltaic cell comprising (e.g., consisting of) a light absorbing material which is connected to an external circuit. A number of photovoltaic cells, conventionally connected in series, constitute a photovoltaic module, which can be used singly or a plurality of them can be connected in series, in parallel or in any other suitable combination as desired, to form photovoltaic panels. Thus, a photovoltaic source 2, 2' having a first connector 3, 3' and a second connector 4, 4' according to the present disclosure can include a photovoltaic module or a plurality of photovoltaic modules. The first connector of these photovoltaic sources will in the following be termed input terminal, while the second connector of these photovoltaic sources will be termed output terminal. Each photovoltaic source 2 can generate an output power at a certain current and a voltage under standard illumination/irradiation present at the location at which the specific photovoltaic system will operate. However, the photovoltaic source 2 can be directly dependent on the instantaneous irradiation from the sun, which occasionally can be more or less blocked by clouds which results in that the output voltage of the photovoltaic system will vary over time. In order to overcome this problem, the present disclosure also includes two voltage adding arrangements 5, 5'. A first voltage adding arrangement 5 connected in series with the first photovoltaic source 2, and a second voltage adding arrangement 5' connected in series with the second photovoltaic source 2'. Each voltage adding arrangement 5, 5' includes a first connector 6, 6' and a second connector 7, 7'. In some versions of the disclosure a voltage adding arrangement may also include a third and a fourth connector. In the context of the present disclosure the first connector of a voltage adding arrangement will be termed first input terminal, while the second connector of a voltage adding arrangement will be termed output terminal. The third and fourth connectors will, when they appear, be termed second input terminal and third input terminal, respectively.

The first input terminal 6 of the first voltage adding arrangement 5 can be connected to a first input terminal 8 of the photovoltaic unit 1, and the output terminal 7 of the first voltage adding arrangement 5 can be connected to the input terminal 3 of the first photovoltaic source 2. The output terminal 4 of the first photovoltaic source 2 is connected to a first output terminal 9 of the photovoltaic unit 1. The input terminal 3' of the second photovoltaic source 2' can be connected to a second input terminal 10 of the photovoltaic unit 1, and the output terminal 4' of the second photovoltaic source 2' can be connected to the first input terminal 6' of the second voltage adding arrangement 5', the output terminal 7' of the second voltage adding arrangement 5' being connected to a second output terminal 11 of the photovoltaic unit 1. In addition, a switch 12 can be arranged between the input terminal 3 of the first photovoltaic source 2 and the output terminal 4' of the second photovoltaic source 2'. Thus, in the figures the first photovoltaic source 2 is located downstream the first voltage adding arrangement 5, and the second photovoltaic source 2' is located upstream the second voltage adding arrangement 5'. However, it could be the other way around as long as one of the photovoltaic sources 2, 2' is located upstream the corresponding voltage adding arrangement 5, 5' and one of the photovoltaic sources 2, 2' is located downstream the corresponding voltage adding arrangement 5, 5'.

According to an exemplary embodiment of the present disclosure, the input terminals 8, 10 of the photovoltaic unit 1 which can serve as the external interface of the photovoltaic system are interconnected, and the output terminals 9, 11 of the photovoltaic unit 1 which can serve as the external interface of the photovoltaic system are interconnected. The photovoltaic system can be arranged to be connected to a grid, power mains, or other suitable output power supply as desired, directly or indirectly, in order to supply the output power of the photovoltaic system to a user.

Each voltage adding arrangement 5, 5' includes a first route 13 and a second route 14 extending between the first input terminal 6, 6' and the output terminal 7, 7' of the voltage adding arrangement 5, 5'. The first route 13 includes a voltage source 15, and the second route 14 which can serve as a voltage source bypass. The first route 13 and the second route 14 being separately activatable. In an exemplary embodiment, the first route 13 and the second route 14 can include separate route switches 16, 16', and preferably only one of the first route 13 and the second route 14 shall be active at a time, in order not to short circuit the voltage source 15. Thus, only one of the first route 13 and the second route 14 can be active at the same time, or both the first route 13 and the second route 14 can be inactive at the same time.

The photovoltaic system has several modes of operation, the most obvious of which being disclosed hereinafter.

In a first mode of operation only one of the first photovoltaic source 2 and the second photovoltaic source 2' is active, e.g. the first route 13 and the second route 14 of the second voltage adding arrangement 5' are inactive, the switch 12 is opened and the second route 14 of the first voltage adding arrangement 5 is active.

In a second mode of operation the first photovoltaic source 2 and the second photovoltaic source 2' are active and connected in parallel with each other, e.g. the second route 14 of both the first voltage adding arrangement 2 and the second voltage adding arrangement 2' are active, and the switch 12 is open.

In a third mode of operation the first photovoltaic source 2 and the second photovoltaic source 2' are active and connected in series with each other, e.g. the first route 13 and the second route 14 of both the first voltage adding arrangement 2 and the second voltage adding arrangement 2' are inactive, and the switch 12 is closed.

In a fourth mode of operation the first photovoltaic source 2 and the first voltage adding arrangement 5 or the second photovoltaic source 2' and the second voltage adding arrangement 5' are active, e.g. the first route 13 and the second route 14 of the second voltage adding arrangement 5' are inactive, the switch 12 is opened and the first route 13 of the first voltage adding arrangement 5 is active.

In a fifth mode of operation the first photovoltaic source 2 and the second photovoltaic source 2' are active and connected in parallel with each other, and at least one of the first route 13 of the first voltage adding arrangement 5 and the first route 13 of the second voltage adding arrangement 5' is active, the switch 12 being open.

In a sixth mode of operation, e.g. when no irradiation is present, the first route 13 of the voltage adding arrangement 5 and the second voltage adding arrangement 5', respectively, are active and connected in series with each other, the switch 12 being closed.

In a seventh mode of operation, e.g. when no irradiation is present, the first route 13 of the voltage adding arrangement 5 and the second voltage adding arrangement 5', respectively, are active and connected in parallel with each other, the switch 12 being open.

It should be pointed out that some structural losses may occur, but if photovoltaic sources and/or voltage sources are connected in series the output voltage of the photovoltaic system will in theory be the sum of the output voltages of the different sources. The photovoltaic system can switch between the different modes of operation when the output voltage of the photovoltaic system needs to be adjusted, e.g. to obtain an essentially constant output voltage of the photovoltaic system. The instantaneous need of output power from the photovoltaic system can also be considered. For example, if the voltage output of a specific photovoltaic source decreases below a predetermined threshold value a voltage source can be activated, and the instantaneous need of output power from the photovoltaic system can be considered to raise or lower the threshold value.

The voltage source 15 can be a fixed voltage source, e.g. a battery, a plurality of batteries, a fuel cell, or a regulated voltage source, e.g. a set of batteries, or an arrangement comprising a regulator and a fixed voltage source, or any other suitable fixed or regulated voltage source as desired.

Figure 2:
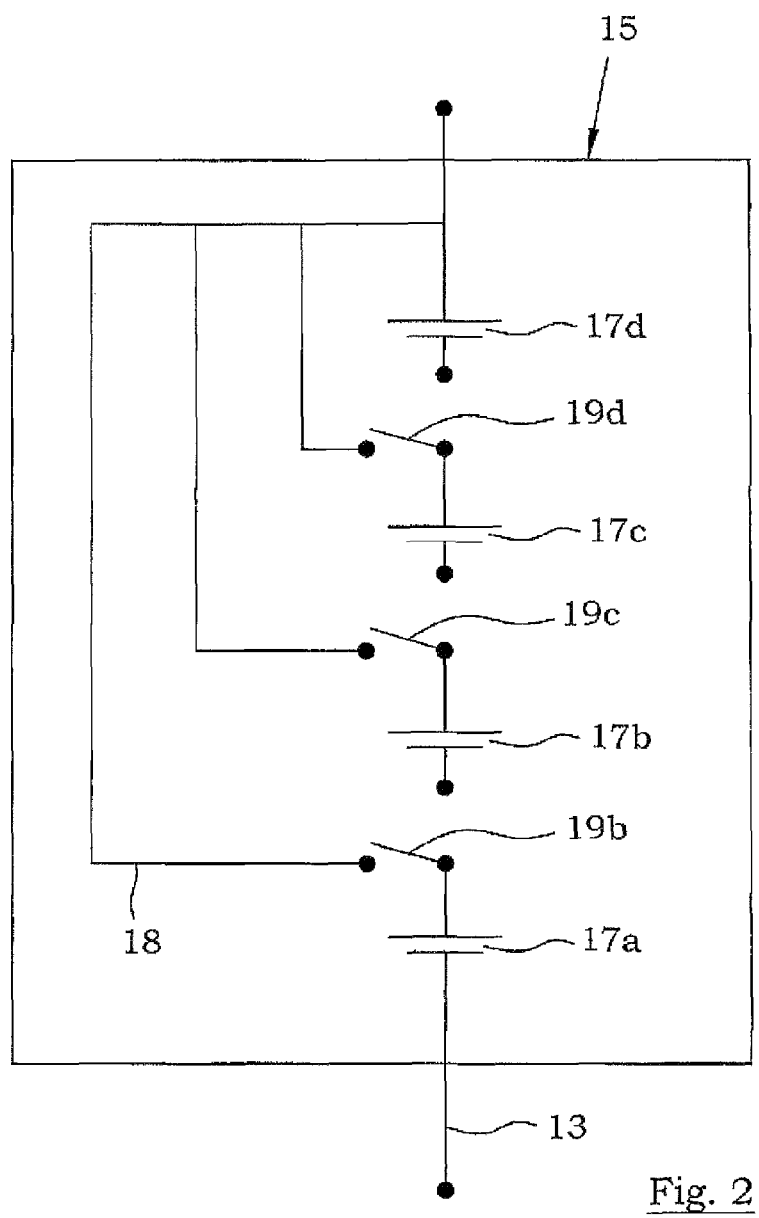
FIG. 2 is a schematic illustration of a regulated voltage source in accordance with an exemplary embodiment.

Reference is now made to FIG. 2, which discloses one example of a regulated voltage source 15. The disclosed regulated voltage source 15 includes four batteries 17*a*, 17*b*, 17*c*, 17*d*, a bypass arrangement 18 of the first route 13 and three switches 19*b*, 19*c*, 19*d*. The default position of each switch 19*b*, 19*c*, 19*d* is in a disconnected position with regard to the corresponding battery 17*b*, 17*c*, 17*d*. The switch that at the present is the lowest switch in the disconnected position also has to be connected to the bypass arrangement 18. However, all switches 18*b*, 18*c*, 18*d*, can be connected to the bypass arrangement 18 when in the disconnected positions. By connecting the switches 19*b*, 19*c*, 19*d* to the corresponding batteries 17*b*, 17*c*, 17*d*, from below and upwards, a stepwise increase of the output voltage from the regulated voltage source 15 is achieved, depending on the instantaneous need of added voltage to the output voltage of the photovoltaic system. Thus, the batteries 17*a*, 17*b*, 17*c*, 17*d* can be individually connectable in series with the first route 13 and with each other. It should be understood that other structural combinations are nevertheless conceivable.

Figure 3:
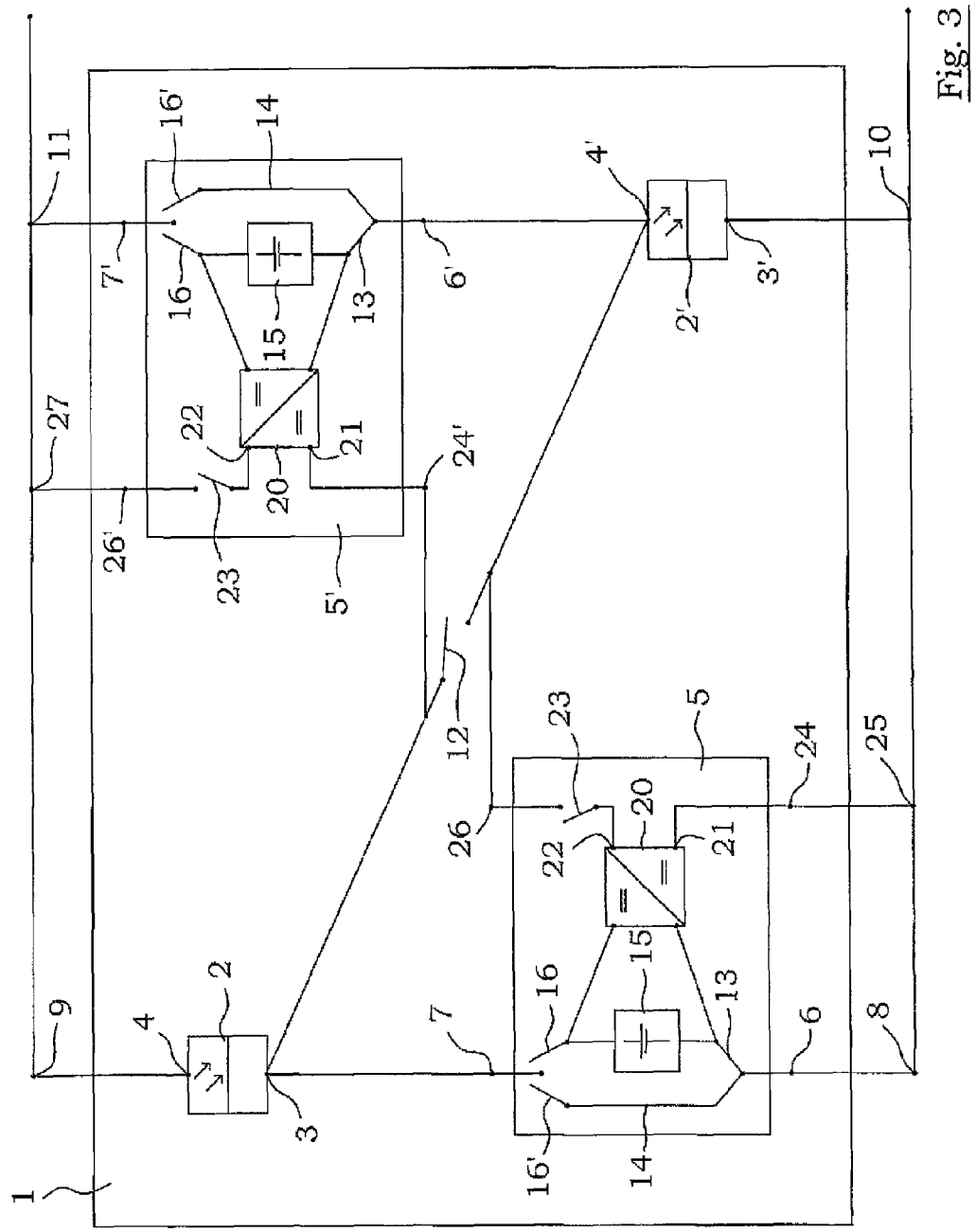
FIG. 3 is a schematic illustration of a second embodiment of the inventive photovoltaic system in accordance with an exemplary embodiment.
Figure 4:
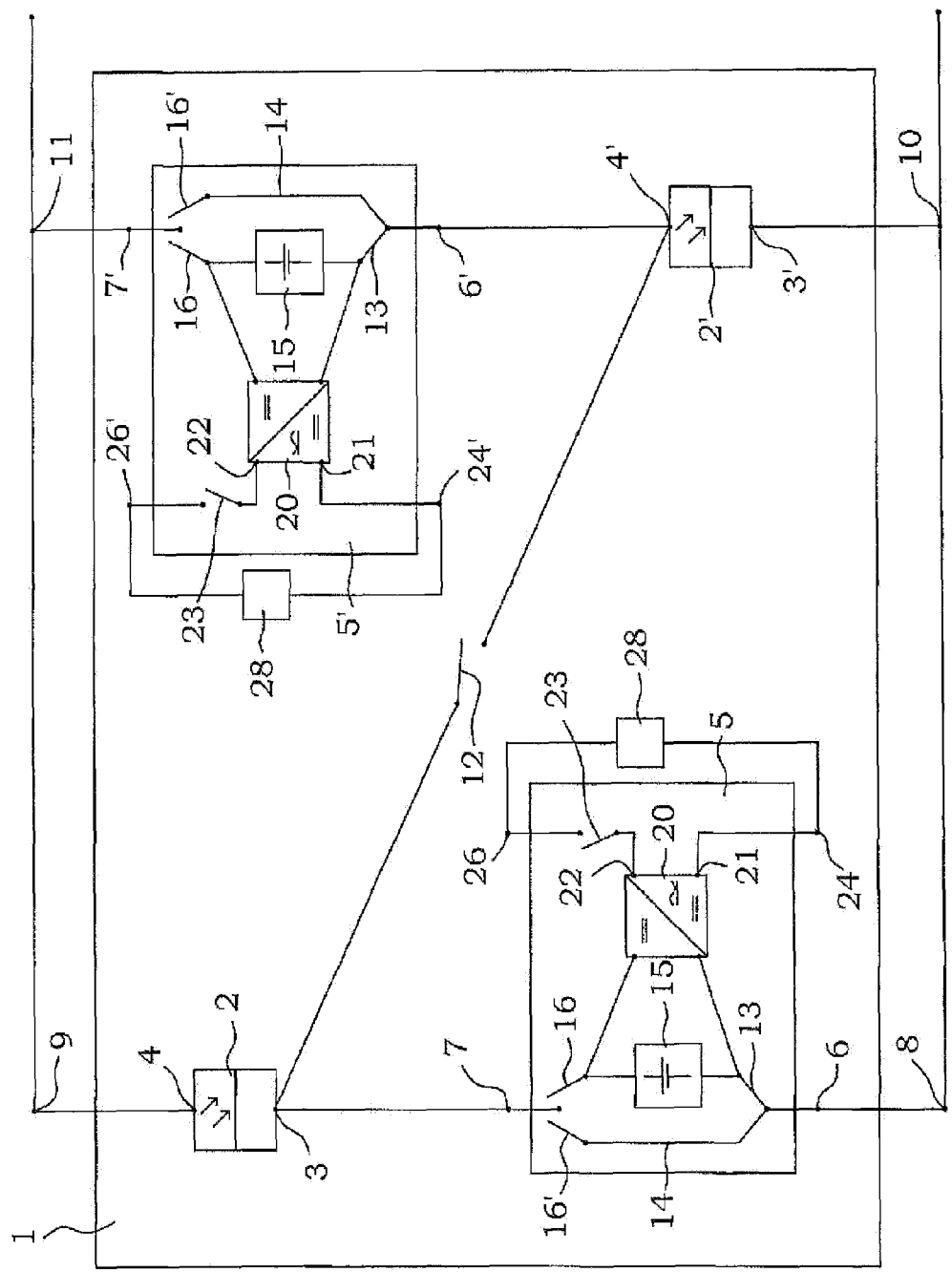
FIG. 4 is a schematic illustration of a third embodiment of the inventive photovoltaic system in accordance with an exemplary embodiment.

Reference is now made to FIGS. 3 and 4, which discloses a second and a third embodiment of the present disclosure, respectively. FIG. 3 is a schematic illustration of a second embodiment of the inventive photovoltaic system in accordance with an exemplary embodiment. FIG. 4 is a schematic illustration of a third embodiment of the inventive photovoltaic system in accordance with an exemplary embodiment.

At least one of the voltage adding arrangements 5, 5' includes a charger device 20 connected to the voltage source 15 of the first route 13. The charger device 20 includes a first input terminal 21 and a second input terminal 22, at least one of which is connected to a charger switch 23. The charger device 20 has an inactive mode when the first route 13 of the voltage adding arrangement 5, 5' is active and/or the charger switch 23 is open, and a charging mode when the first route 13 of the voltage adding arrangement 5, 5' is inactive and the charger switch 23 is closed. The use of a charging device 20 implies that the voltage source 15 is rechargeable. The voltage source 15 can as a basis only be charged when there is no voltage output therefrom. However, if the voltage source 15 includes a set of batteries the, at the present, unused batteries can be charged even if there is a voltage output from the voltage source 15. Thus, when the photovoltaic system is in a mode of operation in which the first route 13, connected to a specific charger device 20, is inactive said specific charger device 20 may be in either the inactive mode or the charging mode, and when the photovoltaic system is in a mode of operation in which first route 13, connected to a specific charger device 20, is active said specific charging device 20 must be in the inactive mode.

FIG. 3 is described in reference, the first voltage adding arrangement 5, however analogous holds this description is applicable for the second voltage adding arrangement 5'. As shown in FIG. 3, the charger device such as a DC/DC converter 20, or other suitable device as desired, has a first input terminal 21 connected to a second input terminal 24 of the first voltage adding arrangement 5. The second input terminal 24 is connected to a third input terminal 25 of the photovoltaic unit 1, and the third input terminal 25 of the photovoltaic unit 1 is connected to the input terminal 3' of the second photovoltaic source 2'. The second input terminal 22 of the DC/DC converter 20 is connected to a third input terminal 26 of the first voltage adding arrangement 5. The third input terminal 26 is connected to the output terminal 4' of the second photovoltaic source 2'. In this exemplary embodiment the first input terminal 21 of the DC/DC converter 20 can be connected directly to the input terminal 3' of the second photovoltaic source 2', and the second input terminal 22 of the DC/DC converter 20 can be connected directly to the output terminal 4' of the second photovoltaic source 2'.

When the DC/DC converter 20 is in the abovementioned charging mode, the output voltage from the second photovoltaic source 2' can be used to charge the voltage source 15 of the first voltage adding arrangement 5. It shall however be pointed out that the voltage source 15 of the first voltage adding arrangement 5 in some situations is indirectly connected to the first photovoltaic source 2 as well. The DC/DC converter 20 can be put in charging mode when the capability of the voltage source 15 reaches a predetermined level and/or when there is a surplus of energy from the second photovoltaic source 2' with regards to the required output voltage of the photovoltaic system. For the second voltage adding arrangement 5', the first input terminal 21 of the charging device 20 is connected, directly or indirectly via the second input terminal 24' of the second voltage adding arrangement 5', to the input terminal 3 of the first photovoltaic source 2, and the second input terminal 22 of the charging device 20 is in the shown embodiment connected via a second output terminal 26' of the second voltage adding arrangement 5' and via a third output terminal 27 of the photovoltaic unit 1 to the output terminal 4 of the first photovoltaic source 2. However, the second input terminal 22 of the charging device 20 may be connected directly to the output terminal 4 of the first voltage adding arrangement 2.

FIG. 4 is described in reference to the first voltage adding arrangement 5, however this description is applicable for the second voltage adding arrangement 5'. As shown in FIG. 4, the charger device such as a AC/DC converter or a DC/DC converter 20, has the first input terminal 21 of which is connected to the second input terminal 24 of the first voltage adding arrangement 5. The second input terminal 22 of the AC/DC converter or the DC/DC converter 20 is connected to the third input terminal 26 of the first voltage adding arrangement 5. The second input terminal 24 and third input terminal 26 of the first voltage adding arrangement 5 is connectable to an external power source 28, e.g. a grid, power mains, a motor, a generator, or other suitable external power source as desired. If the external power source 28 is an AC power source the charging device 20 can be an AC/DC converter 20, or other suitable device as desired, and if the external power source 28 is a DC power source the charging device can be a DC/DC converter 20, or other suitable device as desired. When the AC/DC converter or the DC/DC converter 20 is in the charging mode, the external power source 28 can be used to charge the voltage source 15. The AC/DC converter or the DC/DC converter 20 can be put in charging mode when the capability of the voltage source 15 reaches a predetermined level and/or when there is no voltage output from the voltage source 15. Preferably, the charging device 20 can be set in charging mode during the night, when a slower charging of the voltage source 15 is admitted and thus a smaller charging device 20 is required. It should be pointed out that a common charging device 20 can be used to charge several voltage sources.

Figure 5:
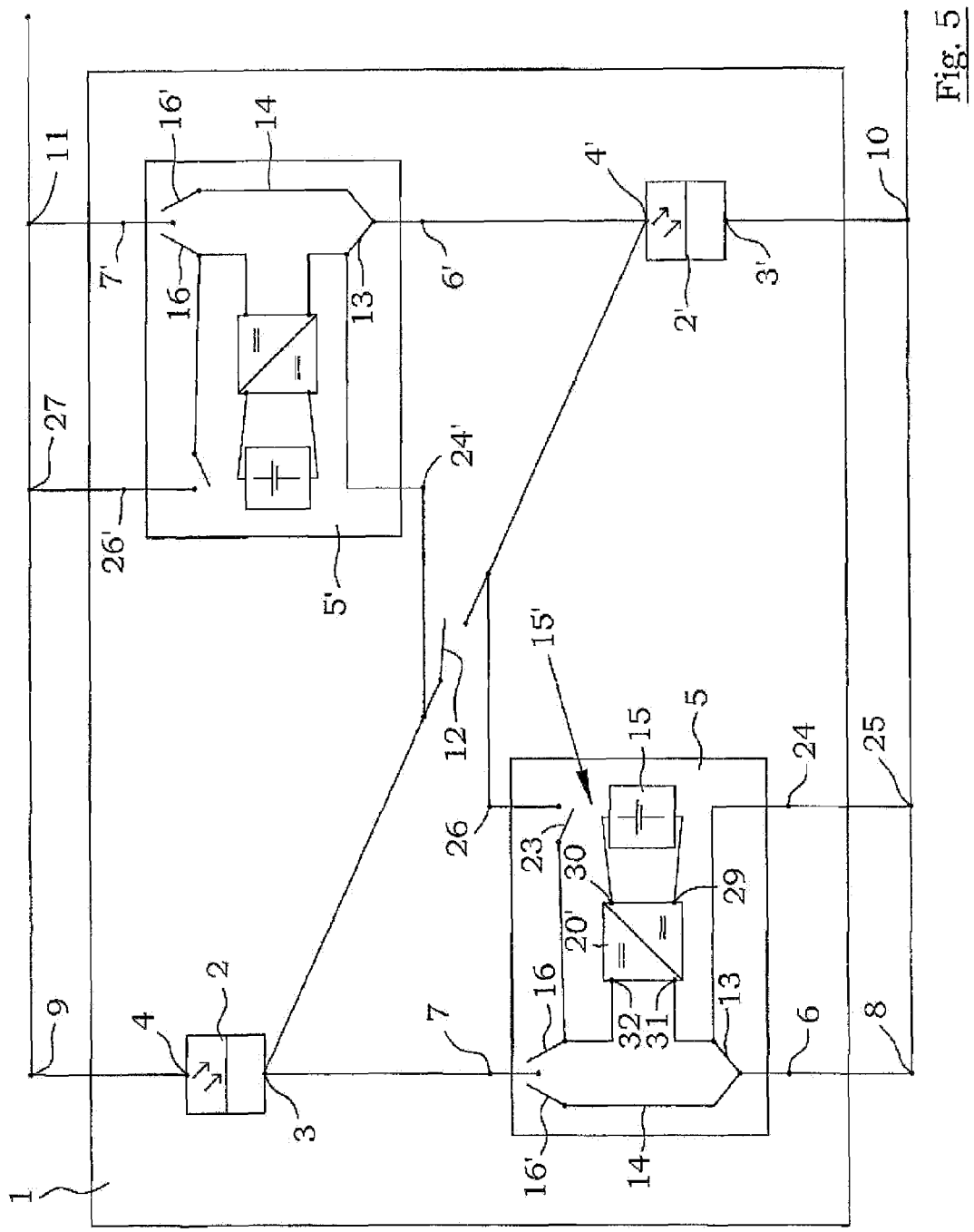
FIG. 5 is a schematic illustration of a fourth embodiment of the inventive photovoltaic system in accordance with an exemplary embodiment.

FIG. 5 is a schematic illustration of a fourth embodiment of the inventive photovoltaic system in accordance with an exemplary embodiment. FIG. 5 is described in reference to the first voltage adding arrangement 5, however, this description is applicable for the second voltage adding arrangement 5'.

As shown in FIG. 5, the first voltage adding arrangement 5 in the shown embodiment includes a regulated voltage source 15'. The regulated voltage source 15' includes a voltage source 15 and a charger device 20'. The charger device 20' can be a bidirectional DC/DC converter, or other suitable device as desired, and the voltage source 15 can be a fixed voltage source, e.g. a battery, or in it self a regulated voltage source, e.g. as disclosed in connection with FIG. 2. The voltage source 15 can be connected to a first input terminal 29 and to a second input terminal 30 of the bidirectional DC/DC converter 20', a first output terminal 31 of the bidirectional DC/DC converter 20' can be connected to the first input terminal 6 of the first voltage adding arrangement 5, and a second output terminal 32 of the bidirectional DC/DC converter 20' can be connected to the first route 13, at the opposite side of the first route switch 16 than the output terminal 7 of the first voltage adding arrangement 5, and can be connected by means of a charger switch 23 to the third input terminal 26 of the first voltage adding arrangement 5. The third input terminal 26 can be connected to the output terminal 4' of the second photovoltaic source 2'. In this exemplary embodiment, the first output terminal 31 of the bidirectional DC/DC converter 20' can be connected, directly or indirectly via the second input terminal 24 of the first voltage adding arrangement 5, to the input terminal 3' of the second photovoltaic source 2', and the second output terminal 32 of the bidirectional DC/DC converter 20' can be connected by means of the charger switch 23 directly to the output terminal 4' of the second photovoltaic source 2'.

The bidirectional DC/DC converter 20' has a regulator mode when the first route 13 of the first voltage adding arrangement 5 is active and the charger switch 23 is open, and a charging mode when the first route 13 of the first voltage adding arrangement 5 is inactive and the charger switch 23 is closed. When the bidirectional DC/DC converter 20' is in the regulator mode, the output voltage from the regulated voltage source 15' can in theory be any value between 0% and 100% of the capacity of the voltage source 15, or even higher than 100% if the regulator is of a suitable boost converter type. As a result, some structural losses may nevertheless occur. Thus, when the photovoltaic system is in a mode of operation in which the first route 13, connected to a specific bidirectional DC/DC converter 20', is inactive the specific bidirectional DC/DC converter 20' can be in either the inactive mode or the charging mode, and when the photovoltaic system is in a mode of operation in which first route 13, connected to a specific bidirectional DC/DC converter 20', is active said specific bidirectional DC/DC converter 20' should be in the regulator mode. The bidirectional DC/DC converter 20' can be put in charging mode when the capacity of the voltage source 15 reaches a predetermined level and/or when there is a surplus of energy from the second photovoltaic source 2' with regards to the required output voltage of the photovoltaic system.

In another exemplary embodiment of FIG. 5, the bidirectional DC/DC converter 20' can be exchanged by a device capable of regulating the output voltage of the voltage source 15. Then the second output terminal 32 of that device should not be connected to the third input terminal 26 of the first voltage adding arrangement 5. In addition, a separate charging device, e.g. as disclosed in connection with the second and third embodiments according to FIGS. 3 and 4, respectively, could be used. That is, such an alternative is then constituted by said second or third embodiment of the present disclosure having a regulated voltage source with a continuously variable output voltage.

It should be pointed out that the voltage adding arrangements 5, 5' according to the first, second, third and fourth embodiments of the present disclosure can be used separately as well as in different combinations in each photovoltaic unit 1.

Reference is now made to FIGS. 6-9, each disclosing an example of a photovoltaic system comprising two photovoltaic units 1, 1' connected in series. The embodiments disclosed in FIGS. 6 and 7 comprises voltage adding arrangements 5, 5' according to the first embodiment of the present disclosure, and the embodiments disclosed in FIGS. 8 and 9 comprises voltage adding arrangements 5, 5' according to the second embodiment of the present disclosure. However, said photovoltaic units 1, 1' may comprise the same or different voltage adding arrangements 5, 5' according to the first, second, third and fourth embodiments of the present disclosure. The different modes of operation related to each photovoltaic unit are combinable in all conceivable ways. In addition, everything that holds for a separate photovoltaic unit 1 as described above, also holds for each photovoltaic unit 1, 1' when connected in series with each other.

Figure 6:
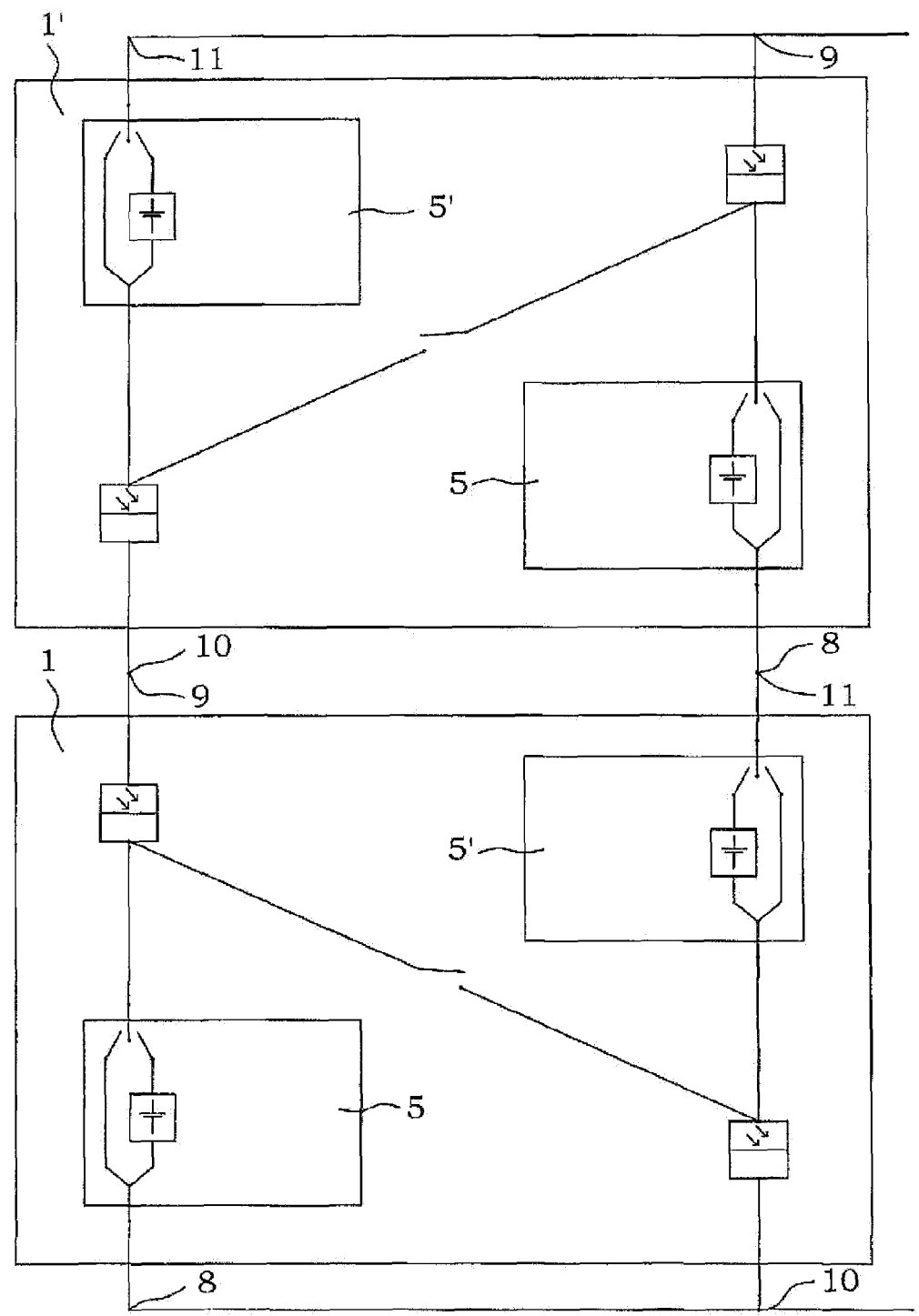
FIG. 6 is a schematic illustration of two photovoltaic units of the first embodiment, connected in a first series connection with each other in accordance with an exemplary embodiment.
Figure 7:
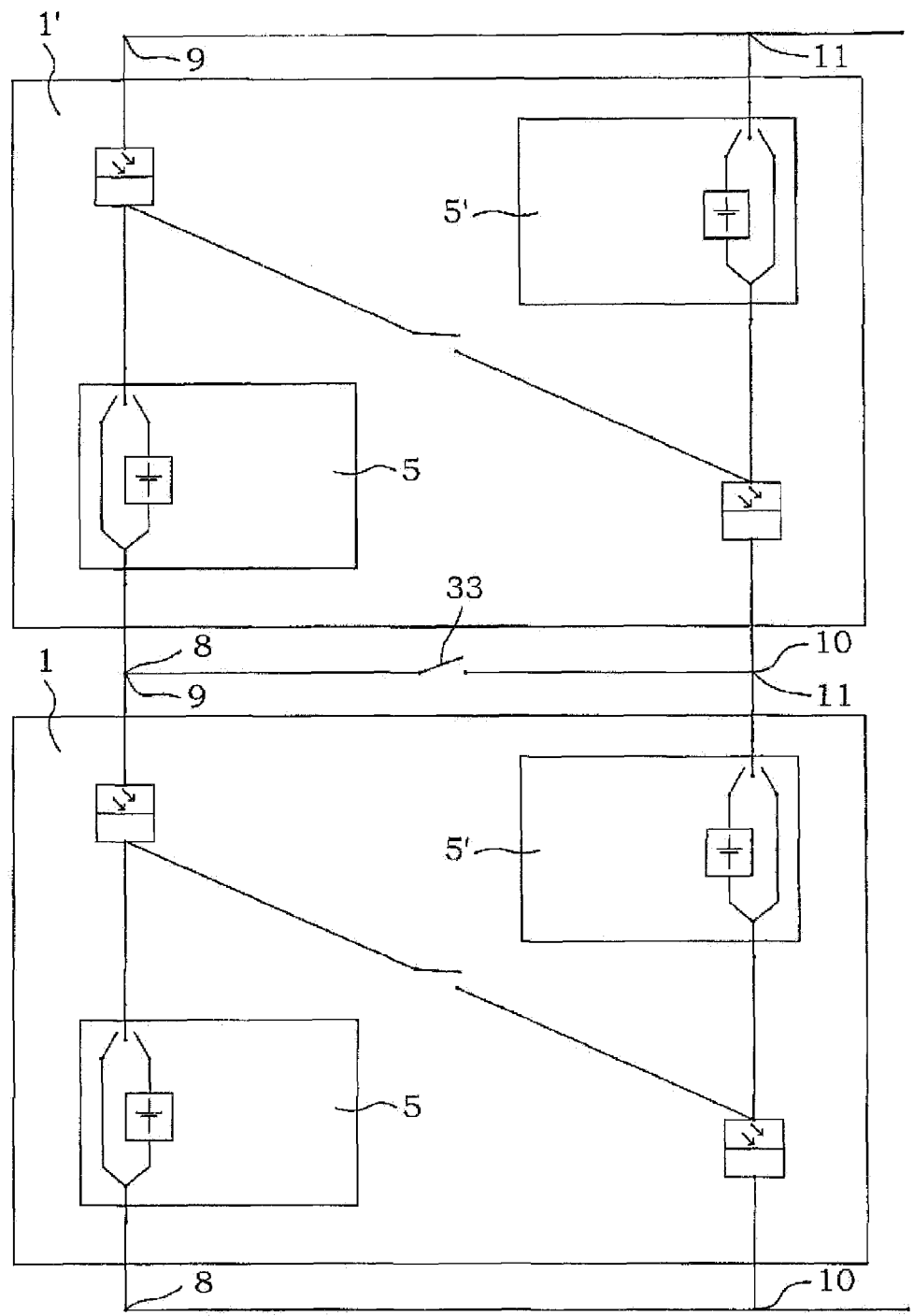
FIG. 7 is a schematic illustration of two photovoltaic units of the first embodiment, connected in a second series connection with each other in accordance with an exemplary embodiment.

In FIGS. 6 and 7 the input terminals 8, 10 of the first photovoltaic unit 1 can serve as an external interface of the photovoltaic system and are thus interconnected, and the output terminals 9, 11 of the second photovoltaic unit 1' can serve as the external interface of the photovoltaic system and are thus interconnected.

FIG. 6 is a schematic illustration of two photovoltaic units of the first embodiment, connected in a first series connection with each other in accordance with an exemplary embodiment. As shown in FIG. 6 the first output terminal 9 of the first photovoltaic unit 1 can be connected to the second input terminal 10 of the second photovoltaic unit 1' and the second output terminal 11 of the first photovoltaic unit 1 can be connected to the first input terminal 8 of the second photovoltaic unit 1'.

FIG. 7 is a schematic illustration of two photovoltaic units of the first embodiment, connected in a second series connection with each other in accordance with an exemplary embodiment. As shown in FIG. 7, the first output terminal 9 of the first photovoltaic unit 1 can be connected to the first input terminal 8 of the second photovoltaic unit 1' and the second output terminal 11 of the first photovoltaic unit 1 can be connected to the second input terminal 10 of the second photovoltaic unit 1'. In addition a switch 33 can be arranged between the first output terminal 9 of the first photovoltaic unit 1 and the second output terminal 11 of the first photovoltaic unit 1.

Figure 8:
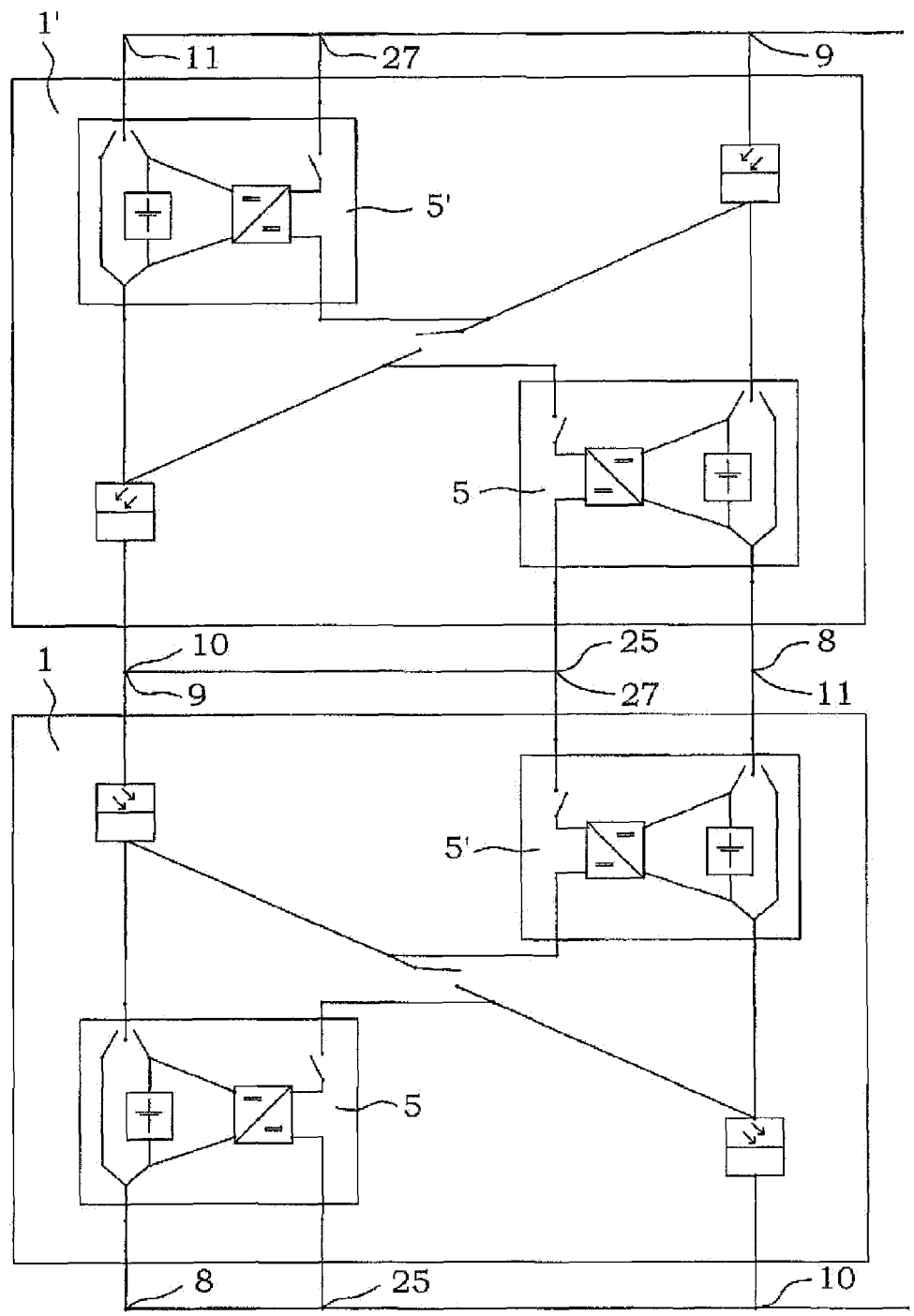
FIG. 8 is a schematic illustration of two photovoltaic units of the second embodiment, connected in a first series connection in accordance with an exemplary embodiment.
Figure 9:
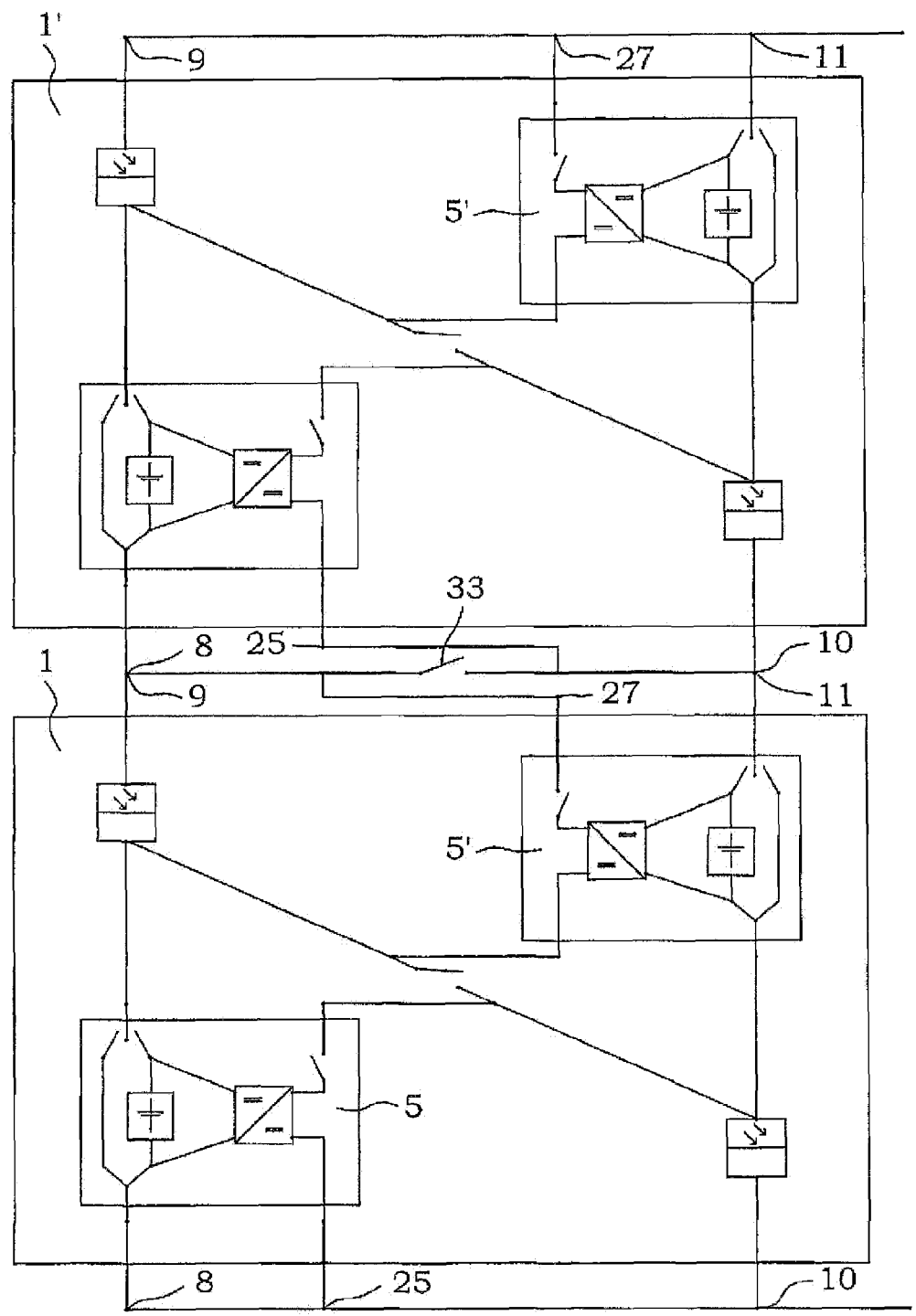
FIG. 9 is a schematic illustration of two photovoltaic units of the second embodiment, connected in a second series connection in accordance with an exemplary embodiment.

In FIGS. 8 and 9 the input terminals 8, 10, 25 of the first photovoltaic unit 1 can serve as the external interface of the photovoltaic system and are thus interconnected, and the output terminals 9, 11, 27 of the second photovoltaic unit 1' can serve as the external interface of the photovoltaic system and are thus interconnected.

FIG. 8 is a schematic illustration of two photovoltaic units of the second embodiment, connected in a first series connection in accordance with an exemplary embodiment. As shown in FIG. 8, the first output terminal 9 of the first photovoltaic unit 1 can be connected to the second input terminal 10 of the second photovoltaic unit 1', the second output terminal 11 of the first photovoltaic unit 1 can be connected to the first input terminal 8 of the second photovoltaic unit 1', the third output terminal 27 of the first photovoltaic unit 1 can be connected to the first output terminal 9 of the first photovoltaic unit 1 and the third input terminal 25 of the second photovoltaic unit 1' can be connected to the second input terminal 10 of the second photovoltaic unit 1'.

FIG. 9 is a schematic illustration of two photovoltaic units, of the second embodiment, connected in a second series connection in accordance with an exemplary embodiment. As shown in FIG. 9, the first output terminal 9 of the first photovoltaic unit 1 can be connected to the first input terminal 8 of the second photovoltaic unit 1' and the second output terminal 11 of the first photovoltaic unit 1 can be connected to the second input terminal 10 of the second photovoltaic unit 1'. In addition a switch 33 can be arranged between the first output terminal 9 of the first photovoltaic unit 1 and the second output terminal 11 of the first photovoltaic unit 1. Thereto, the third output terminal 27 of the first photovoltaic unit 1 can be connected to the first output terminal 9 of the first photovoltaic unit 1 and the third input terminal 25 of the second photovoltaic unit 1' can be connected to the second input terminal 10 of the second photovoltaic unit 1'.

Reference is now made to an exemplary photovoltaic system including two photovoltaic units 1, 1' connected in parallel. The photovoltaic units 1, 1' can include the same or different voltage adding arrangements 5, 5' according to the first, second, third and fourth embodiments of the present disclosure. The different modes of operation related to each photovoltaic unit can be combinable in all conceivable ways. In addition, everything that holds for a separate photovoltaic unit 1 as described above, also holds for each photovoltaic unit 1, 1' when connected in series with each other.

All output terminals of the first photovoltaic unit 1 and of the second photovoltaic unit 1' can serve as the external interface of the photovoltaic system and are thus interconnected, and all input terminals of the first photovoltaic unit 1 and of the second photovoltaic unit 1' can serve as the external interface of the photovoltaic system and are thus interconnected.

The disclosure is not limited only to the embodiments described above and shown in the drawings, which primarily have an illustrative and exemplifying purpose. This patent application is intended to cover all adjustments and variants of the exemplary embodiments described herein, thus the present disclosure is defined by the wording of the appended claims and the equivalents thereof. Thus, the photovoltaic system may be modified in all kinds of ways within the scope of the appended claims.

In the context of the present disclosure the words or expressions "voltage adding arrangement" and "photovoltaic unit" not necessarily have to be delimited by boxes as in the shown embodiments. Furthermore, all input and output terminals disclosed in this document do not need to be physical entities.

Furthermore, in the context of the present disclosure all switches can be controlled by a control system (not shown) which for example may supervise the instantaneous capacity of the voltage source, the instantaneous output voltage from the photovoltaic source, the instantaneous irradiation, or other suitable parameters of the system as desired In the context of the present disclosure the capacity of the voltage sources can be a part of, equal to, or more than, the capacity of the photovoltaic sources, all depending on the specific application. If the photovoltaic system is expected to have an output voltage during long cloudy periods or during the nights, the capacity of the voltage sources should preferably be equal to or more than the capacity of the photovoltaic sources. If the voltage sources are expected to support the photovoltaic sources during short periods of decreased irradiation, the capacity of the voltage sources could for instance be about 10-40% of the capacity of the photovoltaic sources.

Further in the context of the present disclosure all information about/concerning terms such as above, below, under, upper, first, second, third, etc., shall be interpreted/read having the equipment oriented according to the figures, having the drawings oriented such that the references can be properly read. Thus, such terms only indicates mutual relations in the shown embodiments, which relations can be changed if the inventive equipment is provided with another structure/design.

Features from a specific embodiment may be combined with features from another embodiment, the combination shall be considered obvious, if the combination is possible. For example, the charging arrangement according to the second embodiment of the present disclosure can be supplemented with the charging arrangement according to the third embodiment of the present disclosure, in order to admit charging by night if desired.

It should also be pointed out that other photovoltaic sources and/or voltage adding arrangements may be connected to the inventive photovoltaic system in parallel, in series, or in any combination thereof.

Throughout this specification and the claims which follows, unless the context requires otherwise, the word "comprise", and variations such as "comprises" or "comprising", will be understood to imply the inclusion of a stated integer or steps or group of integers or steps but not the exclusion of any other integer or step or group of integers or steps.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A photovoltaic system for generating an output voltage which is essentially uninfluenced by varying irradiation, the photovoltaic system comprising: at least one photovoltaic unit comprising two photovoltaic sources, each photovoltaic source including a first connector and a second connector, wherein the photovoltaic unit includes two voltage adding arrangements, each voltage adding arrangement including a first connector and a second connector, a first route comprising a voltage source and a second route as a voltage source bypass that extend between said first connector and said second connector of each voltage adding arrangement, wherein said first and second routes all separately activatable, wherein the first connector of the first voltage adding arrangement is connected to a first input terminal of the photovoltaic unit, and the second connector of the first voltage adding arrangement is connected to the first connector of the first photovoltaic source, and the second connector of the first photovoltaic source is connected to a first output terminal of the photovoltaic unit, wherein the first connector of the second photovoltaic source is connected to a second input terminal of the photovoltaic unit, and the second connector of the second photovoltaic source is connected to the first connector of the second voltage adding arrangement, and the second connector of the second voltage adding arrangement is connected to a second output terminal of the photovoltaic unit, wherein a switch is arranged between the first connector of the first photovoltaic source and the second connector of the second photovoltaic source, and wherein in addition the input terminals of the photovoltaic unit, which are included in an external interface of the photovoltaic system are interconnected, and the output terminals of the photovoltaic unit which are included in the external interface of the photovoltaic system are interconnected.

2. The photovoltaic system of claim 1, wherein said photovoltaic system comprises at least two photovoltaic units connected in series, wherein the first output terminal of the first photovoltaic unit is connected to the second input terminal of the second photovoltaic unit and the second output terminal of the first photovoltaic unit is connected to the first input terminal of the second photovoltaic unit.

3. The photovoltaic system of claim 1, wherein said photovoltaic system comprises at least two photovoltaic units connected in series, wherein the first output terminal of the first photovoltaic unit is connected to the first input terminal of the second photovoltaic unit and the second output terminal of the first photovoltaic unit is connected to the second input terminal of the second photovoltaic unit, in addition a switch is arranged between the first output terminal of the first photovoltaic unit and the second output terminal of the first photovoltaic unit.

4. The photovoltaic system of claim 1, wherein said photovoltaic system comprises at least two photovoltaic units connected in parallel, the first output terminal and the second output terminal of the first photovoltaic unit are connected to the first output terminal and the second output terminal of the second photovoltaic unit, and the first input terminal and the second input terminal of the first photovoltaic unit are connected to the first input terminal and the second input terminal of the second photovoltaic unit.

5. The photovoltaic system of claim 1, wherein each photovoltaic source includes a photovoltaic module or a plurality of photovoltaic modules.

6. The photovoltaic system of claim 1, wherein the first route and the second route of each voltage adding arrangement comprises a first route switch and a second route switch, respectively.

7. The photovoltaic system of claim 1, wherein each voltage source includes a fixed voltage source or a regulated voltage source.

8. The photovoltaic system of claim 1, wherein each voltage source includes at least one battery.

9. The photovoltaic system of claim 1, wherein at least one voltage source comprises at least two batteries, which are individually connectable in series with the first route and with each other.

10. The photovoltaic system of claim 1, wherein at least one voltage adding arrangement comprises a charger device connected to the voltage source of the first route, wherein the charger device includes a first input terminal and a second input terminal, and wherein at least one of the first and second input terminals are connected to a charger switch.

11. The photovoltaic system of claim 10, wherein the charger device has an inactive mode when the charger switch is open, and a charging mode when the first route of the voltage adding arrangement is inactive and the charger switch is closed.

12. The photovoltaic system of claim 10, wherein the at least one voltage adding arrangement is the first voltage adding arrangement and the charger device includes a DC/DC converter, the first input terminal of which is connected, directly or indirectly, to the first connector of the second photovoltaic source, and the second input terminal of which is connected, directly or indirectly, to the second connector of the second photovoltaic source.

13. The photovoltaic system of claim 10, wherein the at least one voltage adding arrangement is the first voltage adding arrangement and the charger device includes a AC/DC converter or a DC/DC converter, the first input terminal of which is connected to a third connector of the first voltage adding arrangement, and the second input terminal of which is connected to a fourth connector of the first voltage adding arrangement, said third and fourth connectors of the first voltage adding arrangement are connectable to an external power source.

14. The photovoltaic system of claim 1, wherein the first voltage adding arrangement comprises a regulated voltage source, which comprises a voltage source and a charger device, wherein the charger device includes a bidirectional DC/DC converter, wherein the voltage source is connected to a first input terminal and a second input terminal of the bidirectional DC/DC converter, wherein a first output terminal of the bidirectional DC/DC converter is connected to the first connector of the first voltage adding arrangement and directly or indirectly to the first connector of the second photovoltaic source, and wherein a second output terminal of the bidirectional DC/DC converter is connected to the first route at an opposite side of the first route switch than the output terminal of the first voltage adding arrangement and is connected by means of a charger switch, directly or indirectly, to the second connector of the second photovoltaic source.

15. The photovoltaic system of claim 14, wherein the bidirectional DC/DC converter has a regulator mode when the first route of the first voltage adding arrangement is active and the charger switch is open, and a charging mode when the first route of the first voltage adding arrangement is inactive and the charger switch is closed.

* * * * *